United States Patent
Cuevas

Patent Number: 6,017,055
Date of Patent: Jan. 25, 2000

[54] VEHICLE OCCUPANT PROTECTION APPARATUS

[75] Inventor: Jess A. Cuevas, Scottsdale, Ariz.

[73] Assignee: TRW Inc., Lyndhurst, Ohio

[21] Appl. No.: 08/963,399

[22] Filed: Nov. 3, 1997

[51] Int. Cl.[7] .................................................. B60R 21/16
[52] U.S. Cl. ........................ 280/728.2; 280/732; 280/731
[58] Field of Search ................................ 280/728.2, 731, 280/732

[56] References Cited

U.S. PATENT DOCUMENTS

| | | | |
|---|---|---|---|
| 4,941,678 | 7/1990 | Lauritzen et al. | 280/732 |
| 5,135,252 | 8/1992 | Suran et al. | 280/732 |
| 5,207,544 | 5/1993 | Yamamoto et al. | 280/728.2 |
| 5,333,897 | 8/1994 | Landis et al. | 280/728.2 |
| 5,350,190 | 9/1994 | Szigethy | 280/728.2 |
| 5,354,093 | 10/1994 | Schenck et al. | 280/728.2 |
| 5,382,046 | 1/1995 | Cuevas | 280/728.2 |
| 5,433,472 | 7/1995 | Green et al. | 280/728.2 |
| 5,489,116 | 2/1996 | Boag | 280/728.2 |
| 5,503,425 | 4/1996 | Emambakhsh et al. | 280/728.2 |
| 5,503,429 | 4/1996 | Wallner et al. | 280/743.1 |
| 5,527,064 | 6/1996 | Kai et al. | 280/728.2 |
| 5,556,125 | 9/1996 | Ricks et al. | 280/728.2 |
| 5,584,501 | 12/1996 | Walters | 280/728.2 |
| 5,639,112 | 6/1997 | Phillion et al. | 280/728.2 |
| 5,697,638 | 12/1997 | Port | 280/731 |
| 5,762,364 | 6/1998 | Cuevas | 280/731 |

Primary Examiner—Kenneth R. Rice
Attorney, Agent, or Firm—Tarolli, Sundheim, Covell, Tummino & Szabo L.L.P.

[57] ABSTRACT

An apparatus (10) includes a module (38) which is assembled separately from a vehicle part (18) upon which the module (38) is mounted in a vehicle. The module (38) has a plurality of interconnected parts including an inflatable vehicle occupant protection device (14), an inflator (12), and a reaction canister (40) in which the protection device (14) and the inflator (12) are received. The reaction canister (40) includes a fastener structure (60). The fastener structure (60) is configured to snap together with the vehicle part (18) to establish a mechanical interlock between the module (38) and the vehicle part (18) upon movement of the module (38) to an installed position on the vehicle part (18).

10 Claims, 4 Drawing Sheets

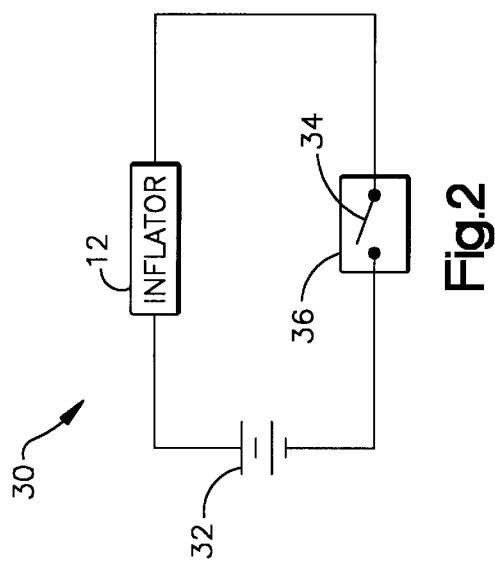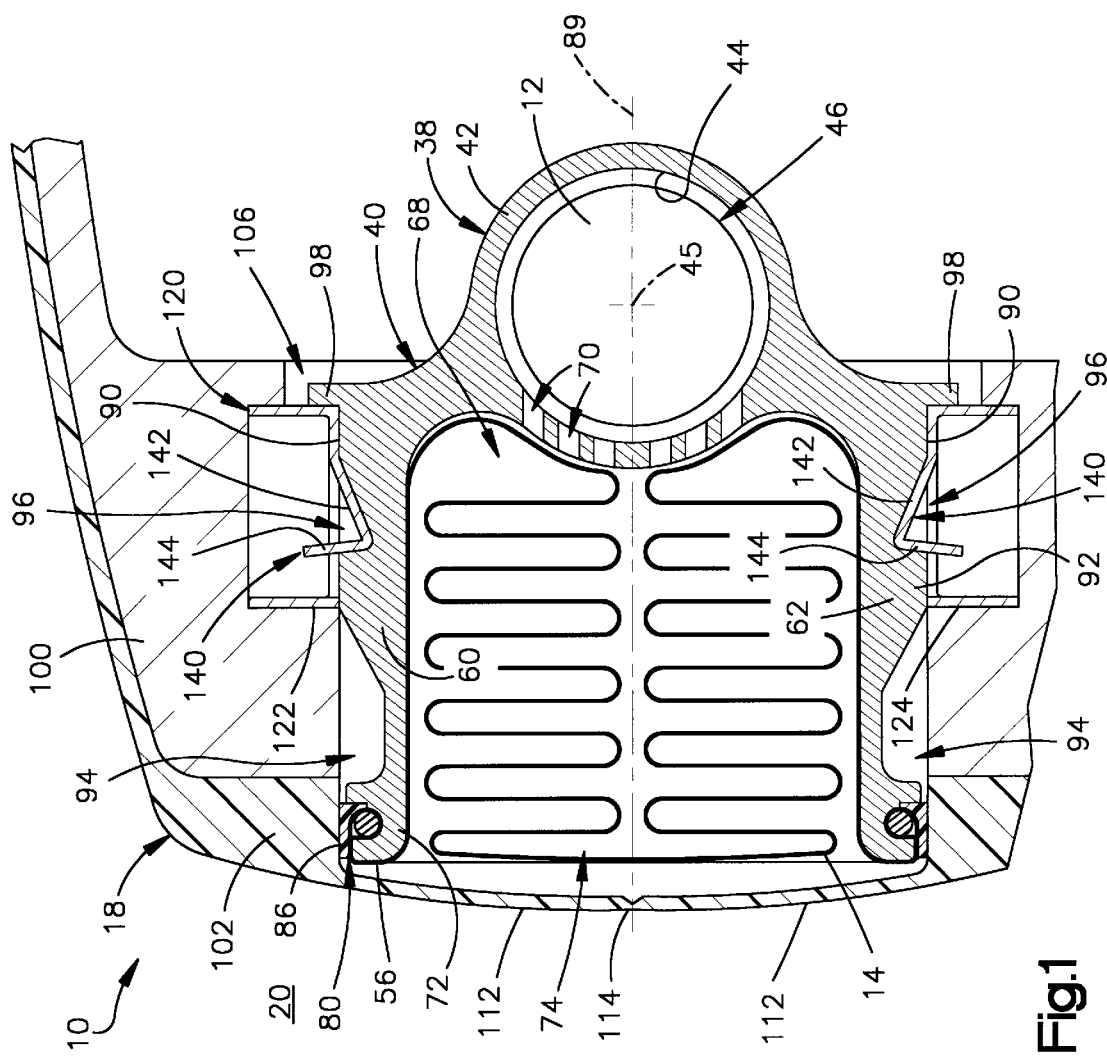

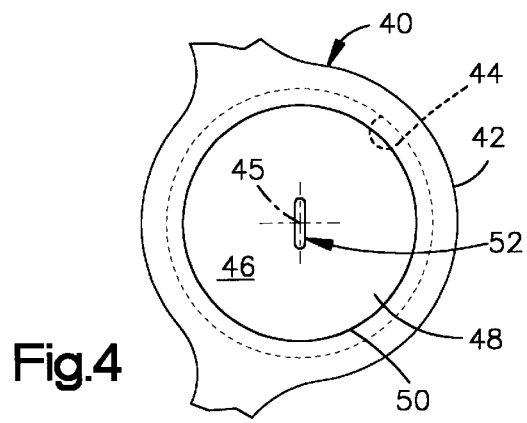
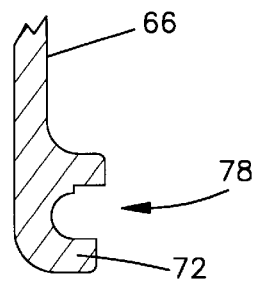
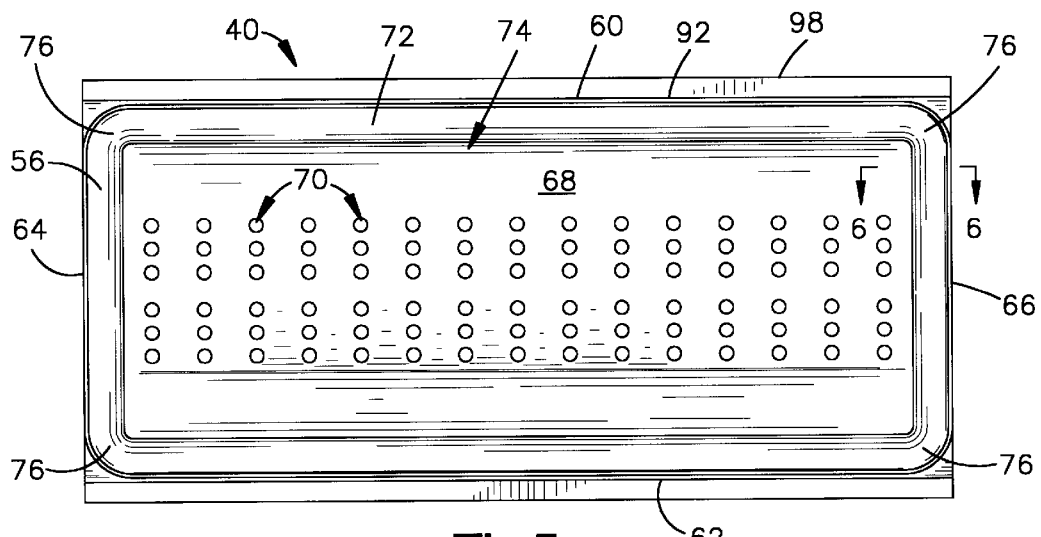
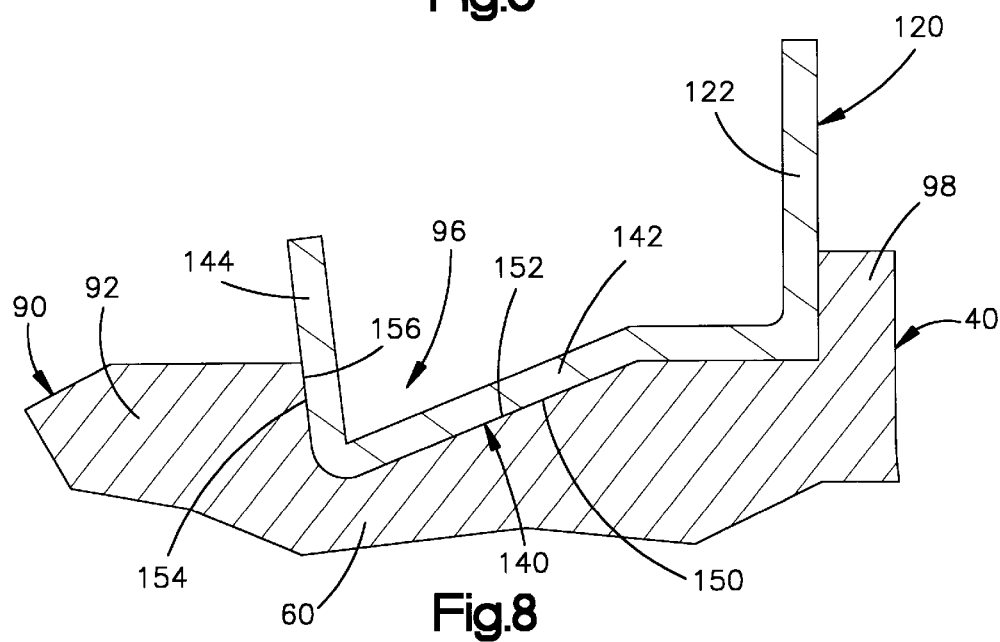

VEHICLE OCCUPANT PROTECTION APPARATUS

FIELD OF THE INVENTION

The present invention relates to an apparatus for protecting an occupant of a vehicle, and particularly relates to a module including an inflatable vehicle occupant protection device.

BACKGROUND OF THE INVENTION

An inflatable vehicle occupant protection device, such as an air bag, is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the crash sensor. The air bag module is installed in or on a part of the vehicle adjacent to the vehicle occupant compartment. In addition to an air bag and an inflator, an air bag module may include a reaction canister in which the air bag and the inflator are received. The reaction canister typically has mounting tabs with apertures for receiving fasteners that fasten the module in its installed position in the vehicle.

SUMMARY OF THE INVENTION

In accordance with the present invention, an apparatus comprises a module which is assembled separately from a vehicle part upon which the module is mounted in a vehicle. The module has a plurality of interconnected parts including an inflatable vehicle occupant protection device, an inflator, and a reaction canister in which the protection device and the inflator are received. The reaction canister includes a fastener structure. The fastener structure is configured to snap together with the vehicle part to establish a mechanical interlock between the module and the vehicle part upon movement of the module to an installed position on the vehicle part.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of an apparatus comprising a preferred embodiment of the present invention;

FIG. 2 is a schematic view of an electrical circuit including a part of the apparatus of FIG. 1;

FIG. 4 is a partial view of a part shown in FIG. 1;

FIG. 5 is a front view of a part shown in FIG. 1;

FIG. 6 is a view taken on line 6—6 of FIG. 5;

FIG. 8 is an enlarged partial view of parts shown in FIG. 1.

DESCRIPTION OF A PREFERRED EMBODIMENT

Figure 3:
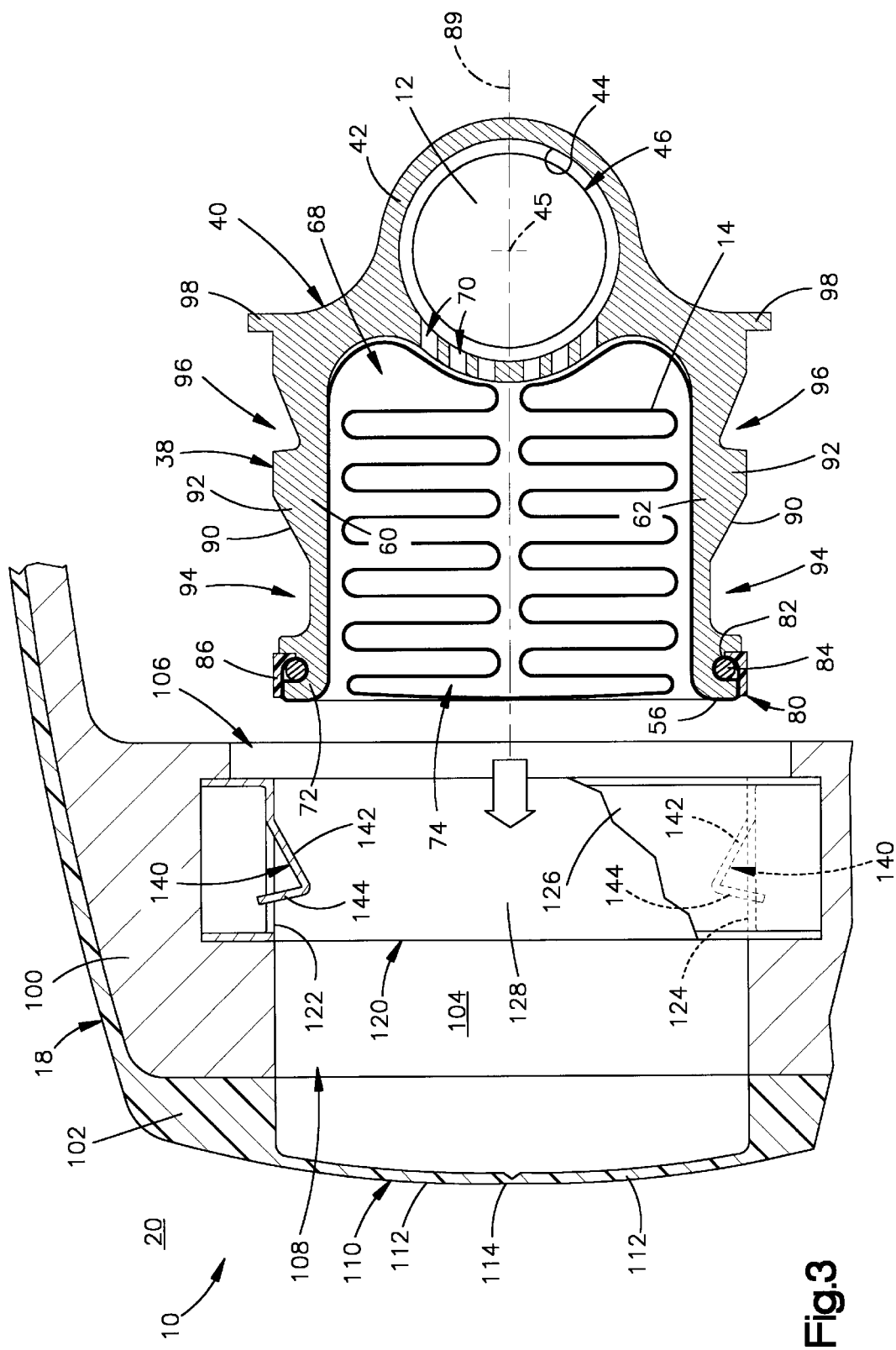
FIG. 3 is a view similar to FIG. 1 showing parts in different positions.

An apparatus 10 comprising a preferred embodiment of the present invention is shown partially in FIG. 1. The apparatus 10 includes an inflator 12 and a particular type of inflatable vehicle occupant protection device 14 which is commonly referred to as an air bag. The inflator 12 and the air bag 14 are mounted in a vehicle part 18 adjacent to the vehicle occupant compartment 20. In the preferred embodiment of the present invention shown in the drawings, the vehicle part 18 is the instrument panel. When the air bag 14 is being inflated, it moves from the instrument panel 18 into the vehicle occupant compartment 20. The air bag 14 then restrains movement of an occupant of the vehicle toward the instrument panel 18 to help protect the occupant from a forceful impact with the instrument panel 18 or other parts of the vehicle.

The inflator 12, which is shown schematically in FIG. 1, comprises a cylindrical structure containing a source of inflation fluid for inflating the air bag 14. As known in the art, the inflator may contain an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid.

As shown schematically in FIG. 2, the inflator 12 is included in an electrical circuit 30 with a power source 32 and a normally open switch 34. The power source 32 is preferably the vehicle battery and/or a capacitor. The switch 34 is part of a sensor 36 which senses a vehicle condition indicating the occurrence of a vehicle crash. Such a condition may comprise, for example, sudden vehicle deceleration caused by a crash. If the crash-indicating condition is at or above a predetermined threshold level, it indicates the occurrence of a crash having at least a predetermined threshold level of severity. The threshold level of crash severity is a level at which inflation of the air bag 14 is desired to restrain movement of an occupant of the vehicle, as described above. The switch 34 then closes, and electric current is directed through the inflator 12 to actuate the inflator 12. As a result, the inflator 12 rapidly emits a large volume of inflation fluid which flows into the air bag 14 to inflate the air bag 14.

The inflator 12 and the air bag 14 are parts of an air bag module 38. The module 38 is an assembly of parts that are interconnected separately from the instrument panel 18, as shown in FIG. 3, and is installed in the instrument panel 18, as shown in FIG. 1.

In addition to the inflator 12 and the air bag 14, the interconnected parts of the module 38 include a reaction canister 40 which contains the inflator 12 and the air bag 14. The canister 40 in the preferred embodiment of the present invention is a one-piece structure. By "one-piece" it is meant that the canister 40 is made from a single homogenous material, and is a single unit exclusive of separate but joined elements. Preferably, the single homogeneous material is a material comprised at least substantially of aluminum, i.e., aluminum or an aluminum alloy, but could be any other metal, plastic, or composite material which is strong enough to contain and support the inflator 12 and the air bag 14 when cast or molded into the configuration of the canister 40.

A rear portion 42 of the canister 40 has a generally cylindrical configuration defined in part by a cylindrical inner surface 44. The cylindrical inner surface 44 has a longitudinal central axis 45, and defines the diameter of an elongated cylindrical compartment 46 which is centered on the axis 45. The inflator 12 is received in the compartment 46, as shown schematically in FIGS. 1 and 3.

As shown in greater detail in FIG. 4, the compartment 46 has a closed end defined by a circular wall 48 at one end of the rear portion 42 of the canister 40. The compartment 46 has an open end defined by an annular rim 50 at the other end of the rear portion 42. When the inflator 12 is installed in the compartment 46, a key (not shown) at one end of the inflator 12 is received through a slot 52 in the wall 48 in a known manner. The rim 50 supports the other end of the inflator 12 in a known manner.

A front portion 56 of the canister 40 has a rectangular configuration (FIG. 5) defined by a pair of upper and lower side walls 60 and 62 extending longitudinally between a pair of opposite end walls 64 and 66. The four walls 60–66 at the front portion 56 of the canister 40 define the periphery of a rectangular compartment 68 in which the air bag 14 is received and stored in a folded, uninflated condition. Although the air bag 14 shown in the drawings is located entirely within the compartment 68, it could alternatively project outward from the compartment 68 at the front of the canister 40. A plurality of passages 70 in the rear portion 42 of the canister 40 direct inflation fluid from the inflator 12 in the cylindrical compartment 46 to the air bag 14 in the rectangular compartment 68.

The four walls 60–66 at the front portion 56 of the canister 40 further define a rim 72 which surrounds an open front end 74 of the compartment 68. As best shown in FIG. 5, the rim 72 has a rectangular peripheral shape with rounded corners 76. A groove 78 (FIG. 6) extends entirely around the outer periphery of the rim 72. A beaded mouth 80 of the air bag 14 is received in the groove 78, as shown in FIGS. 1 and 3. The beaded mouth 80 comprises an edge portion 82 of the air bag 14 which is fastened in a loop around a nylon cord 84. The edge portion 82 of the air bag 14 may be fastened around the cord 84 in any suitable manner known in the art such as, for example, by stitching, adhesive bonding and/or laser or ultrasonic welding. The beaded mouth 80 is installed in the groove 78 by stretching the cord 84 over the rim 72 of the canister 40, and by letting the cord 84 snap resiliently into the groove 78. A protective plastic band 86 is then installed over the edge portion 82 of the air bag 14, as shown in FIGS. 1 and 3.

The configuration of the canister 40 is symmetrical with respect to a plane 89 located mid-way between the upper and lower side walls 60 and 62. Accordingly, the upper and lower side walls 60 and 62 have oppositely facing outer surfaces 90 with contours that are alike. As shown in FIG. 3, each outer surface 90 defines a ramp 92 on the respective side wall 60 or 62. Each outer surface 90 also defines a first trough-shaped recess 94 forward of the corresponding ramp 92, and a second trough-shaped recess 96 rearward of the corresponding ramp 92. Moreover, each outer surface 90 further defines a rectangular flange 98 projecting vertically from the rear end of the respective side wall 60 or 62.

The instrument panel 18 includes a structural frame 100 and a trim panel 102. The structural frame 100 defines a passage 104 having an inner end 106 and an outer end 108. The trim panel 102 covers and conceals the structural frame 100 from view in the vehicle occupant compartment 20, and includes a deployment panel 110 which extends over the outer end 108 of the passage 104. As shown by way of example in FIG. 1, the deployment panel 110 includes a pair of pivotal deployment doors 112. Each deployment door 112 is bounded on three sides by a thinned section 114 of the deployment panel 110. The thinned section 114 ruptures under the influence of inflation fluid pressure forces applied to the deployment doors 112 by the inflating air bag 14. Alternatively, the deployment panel 110 may have any other suitable structure known in the art.

The structural frame 100 of the instrument panel 18 includes a fastener frame 120. The fastener frame 120 is located between the inner and outer ends 106 and 108 of the passage 104. The fastener frame 120 has a rectangular peripheral shape defined by a plurality of channel-shaped members. These include a pair of upper and lower side members 122 and 124 extending longitudinally between a pair of opposite end members 126 and 128. The upper and lower side members 122 and 124 have configurations that are alike, but are oriented oppositely relative to each other. The opposite end members 126 and 128 also have configurations that are alike, and also are oriented oppositely relative to each other.

Each of the side members 122 and 124 of the fastener frame 120 includes a plurality of flexible locking tabs 140 which are spaced apart from each other in a longitudinally extending row. The locking tabs 140 on the upper side member 122 (one of which is shown in FIG. 3) have angular configurations defined by hinge sections 142 and free end sections 144. The hinge sections 144 project downward at an acute angle from the upper side member 122. The free end sections 144 project upward at an acute angle from the hinge sections 142. The locking tabs 140 on the lower side member 124 (one of which also is shown in FIG. 3) have reversed angular configurations defined by oppositely projecting hinge sections 142 and oppositely projecting free end sections 144.

As shown in FIG. 1, the module 38 is installed in the passage 104 in the structural frame 100 of the instrument panel 18. The module 38 is moved inward through the inner end 106 of the passage 104, and further inward through the fastener frame 120, as indicated by the arrow shown in FIG. 3.

The module 38 first contacts the locking tabs 140 when the beaded mouth 80 of the air bag 14 moves against the hinge sections 142 of the tabs 140. The rim 72 of the canister 40 forces the hinge sections 142 to deflect pivotally outward of the fastener frame 120 as the module 38 begins to move past the tabs 140 from right to left, as viewed in FIG. 3. The band 86 protects the edge portion 82 of the air bag 14 from being damaged by the force of the rim 72 acting against the tabs 140.

The tabs 140 snap resiliently back inward of the fastener frame 120, and thus move into the first recesses 94 on the opposite side walls 60 and 62 of the canister 40, as the rim 72 of the canister 40 moves beyond the tabs 140 toward the outer end 108 of the passage 104. The module 38 is then located in a partially installed position, as shown in FIG. 7, which is spaced from the fully installed position of FIG. 1.

Figure 7:
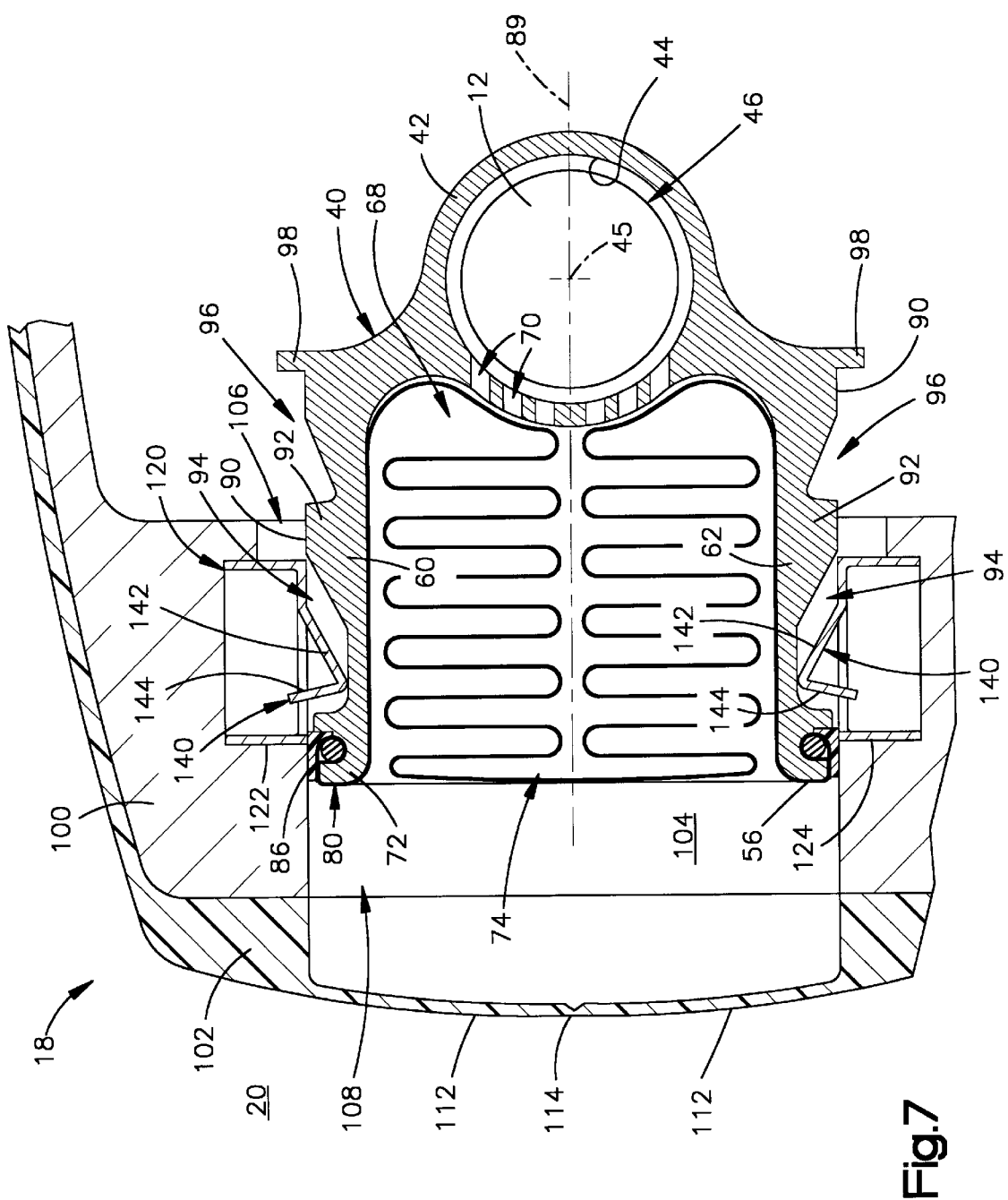
FIG. 7 also is a view similar to FIG. 1 showing parts in different positions.

If the module 38 is pulled back outward from the partially installed position of FIG. 7, the rim 72 of the canister 40 will move against the free end sections 144 of the tabs 140. However, in accordance with a particular feature of the present invention, the free end sections 144 of the tabs 140 are inclined at an angle that is steep enough to prevent the rim 72 from pivoting the tabs 140 back outward of the fastener frame 120. The rim 72 and the tabs 140 thus block removal of the module 38 from the instrument panel 18 when the module 38 is in the partially installed position on the instrument panel 18. Moreover, the tabs 140 preferably do not return fully to their original, undeflected positions when moving into the first recesses 94. This causes the hinge sections 142 of the tabs 140 to be stressed slightly by the canister 40 so as to apply a retaining force that holds the module 38 steadily in the partially installed position. An installer can then connect the inflator 12 in the electrical circuit 30 (FIG. 2) without supporting the module 38 manually.

When the module 38 is moved from the partially installed position of FIG. 7 to the fully installed position of FIG. 1, the tabs 140 are again deflected pivotally outward of the fastener frame 120 as the ramps 92 on the canister 40 move against the hinge sections 142. Next, the tabs 140 snap resiliently back inward of the fastener frame 120, and thus move into the second recesses 96 on the canister 40move bee ramps 92 move beyond the tabs 140. The flanges 98 on the canister 40 simultaneously move into abutment with the side members 122 and 124 of the fastener frame 120.

As best shown in enlarged detail in FIG. 8, the tabs 140 fit closely against the outer surfaces 90 of the canister 40 within the second recesses 96. Specifically, the hinge sections 142 of the tabs 140 have planar surfaces 150 that adjoin planar sections 152 of the outer surfaces 90. The free end sections 144 of the tabs 140 likewise have planar surfaces 154 that adjoin corresponding planar sections 156 of the outer surfaces 90. In this manner, the free end sections 144 of the tabs 140 abut the ramps 90 to block movement of the canister 40, and hence the entire module 38, to the right as viewed in FIG. 1. Further movement of the module 38 to the left is blocked by abutment of the flanges 98 with the fastener frame 120.

In accordance with another feature of the present invention, the second recesses 96 in the side walls 60 and 62 of the canister 40 are substantially shallower than the first recesses 94. This causes the hinge sections 142 of the tabs 140 to be stressed by the canister 40 in correspondingly greater amounts when the tabs 140 are received in the second passages 96. The additional stress in the tabs 140 helps to maintain the adjoining fit between the tabs 140 and the side walls 60 and 62 of the canister 40 to prevent rattling and vibration of the those parts. Further in accordance with this feature of the present invention, the free end sections 144 of the tabs 140 are deflected pivotally relative to the hinge sections 142 upon moving against the planar surfaces 156 in the second recesses 96. Preferably, the free end sections 144 are deflected about 2° or 3° from their original, undeflected conditions, and are inclined from a vertical plane at an angle of about 2°–5° when received in the second recesses 96. This causes the free end sections 144 of the tabs 140 also to be stressed within the second recesses 96, and thereby to tighten the fit of the tabs 140 with the side walls 60 and 62 of the canister 40.

In accordance with yet another feature of the present invention, the canister 40 and the structural frame 100 of the instrument panel 18 together conceal and block access to the interlocked tabs 140 and side walls 60 and 62. This provides theft protection for the module 38 by precluding disengagement of those parts from their mechanically interlocked condition when the module 38 is in its fully installed position.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a module which is assembled separately from a vehicle part upon which said module is mounted in a vehicle, said module having a plurality of interconnected parts including an inflatable vehicle occupant protection device, an inflator, and a reaction canister in which said protection device and said inflator are received;
   said reaction canister including a fastener structure configured to snap together with the vehicle part to establish a mechanical interlock between said module and the vehicle part upon movement of said module to an installed position on the vehicle part; and
   said fastener structure being configured to snap together with the vehicle part in a partially interlocked condition upon movement of said module to a partially installed position on the vehicle part, said partially interlocked condition allowing further movement of said module to said installed position and blocking removal of said module oppositely from said partially installed position.

2. Apparatus as defined in claim 1 wherein said reaction canister has walls that define the periphery of a compartment in which said protection device is received, said fastener structure comprising an outer surface of one of said walls, said outer surface defining a space that receives a resiliently bendable locking tab on the vehicle part upon movement of said canister to said installed position.

3. Apparatus as defined in claim 1 wherein said reaction canister comprises a one-piece structure having walls that define the periphery of a compartment in which said protection device is received, said fastener structure being part of said one-piece structure.

4. Apparatus as defined in claim 3 wherein said fastener structure comprises an outer surface of one of said walls, said outer surface defining a space that receives a resiliently bendable locking tab on the vehicle part upon movement of said canister to said installed position.

5. Apparatus as defined in claim 4 wherein said fastener structure is one of a pair of fastener structures comprising a pair of oppositely facing outer surfaces on an opposed pair of said walls.

6. Apparatus as defined in claim 5 wherein said fastener structures have configurations that are alike.

7. Apparatus as defined in claim 6 wherein said reaction canister is symmetrical with respect to a plane located mid-way between said opposed pair of said walls.

8. Apparatus comprising:
   a module which is assembled separately from a vehicle part upon which said module is mounted in a vehicle, said module having a plurality of interconnected parts including an inflatable vehicle occupant protection device, an inflator, and a reaction canister in which said protection device and said inflator are received;
   said reaction canister including a fastener structure configured to snap together with the vehicle part to establish a mechanical interlock between said module and the vehicle part upon movement of said module to an installed position on the vehicle part;
   said reaction canister has walls that define the periphery of a compartment in which said protection device is received, said fastener structure comprising an outer surface of one of said walls, said outer surface defining a space that receives a resiliently bendable locking tab on the vehicle part upon movement of said canister to said installed position, wherein said outer surface further defines an additional space that receives the locking tab in said partially interlocked condition upon movement of said module to said partially installed position.

9. Apparatus comprising:
   a vehicle part having a trim portion covering a structural portion; and
   a module which is assembled separately from said vehicle part, said module having a plurality of interconnected parts including an inflatable vehicle occupant protection device, an inflator, and a reaction canister in which said protection device and said inflator are received;

said reaction canister and said structural portion of said vehicle part including fastener structures, said fastener structures being configured to snap together to establish a mechanical interlock between said module and said structural portion of said vehicle part upon movement of said module to an installed position on said vehicle part; and said fastener structures being configured to snap together in a partially interlocked condition upon movement of said module to a partially installed position on the vehicle part, said partially interlocked condition allowing further movement of said module to said installed position and blocking removal of said module oppositely from said partially installed position.

10. Apparatus comprising:

a vehicle part having a trim portion covering a structural portion; and a module which is assembled separately from said vehicle part, said module having a plurality of interconnected parts including an inflatable vehicle occupant protection device, an inflator, and a reaction canister in which said protection device and said inflator are received;

said reaction canister and said structural portion of said vehicle part including fastener structures, said fastener structures being configured to snap together to establish a mechanical interlock between said module and said structural portion of said vehicle part upon movement of said module to an installed position on said vehicle part; and said reaction canister has a rim configured to deflect said fastener structure on said structural portion of said vehicle part during movement of said module to said installed position, said protection device having a beaded mouth portion supported by said rim, said parts of said module further including a protective band received over said beaded mouth portion of said air bag.

* * * * *